United States Patent
Le Borgne et al.

(10) Patent No.: US 9,316,120 B2
(45) Date of Patent: Apr. 19, 2016

(54) METHOD FOR MANUFACTURING A TURBINE-ENGINE FAN CASING HAVING AN ACOUSTIC COATING

(75) Inventors: Benedicte Marie Le Borgne, Paris (FR); Erwan Camus, Melun (FR); Julien Schneider, Corbeil-Essonnes (FR)

(73) Assignee: SNECMA, Paris (FR)

( * ) Notice: Subject to any disclaimer, the term of this patent is extended or adjusted under 35 U.S.C. 154(b) by 284 days.

(21) Appl. No.: 14/232,514

(22) PCT Filed: Jul. 9, 2012

(86) PCT No.: PCT/FR2012/051611
§ 371 (c)(1),
(2), (4) Date: Jan. 13, 2014

(87) PCT Pub. No.: WO2013/007937
PCT Pub. Date: Jan. 17, 2013

(65) Prior Publication Data
US 2014/0150262 A1 Jun. 5, 2014

(30) Foreign Application Priority Data
Jul. 13, 2011 (FR) ...................................... 11 56446

(51) Int. Cl.
*F01D 25/24* (2006.01)
*B29C 70/08* (2006.01)
(Continued)

(52) U.S. Cl.
CPC .............. *F01D 25/24* (2013.01); *B29C 70/088* (2013.01); *B29C 70/48* (2013.01); *B29C 70/86* (2013.01);
(Continued)

(58) Field of Classification Search
CPC ...... F01D 25/24; F01D 11/122; B29C 70/088; B29C 70/48; B29C 70/86; B29C 70/462; F02C 7/045; Y10T 29/49327; F05D 2300/702; F05D 2300/44; F05D 2300/701; F05D 2300/603; F05D 2300/614; F05D 2260/96; B29B 11/16
See application file for complete search history.

(56) References Cited

U.S. PATENT DOCUMENTS

| 4,600,619 A | 7/1986 | Chee et al. |
| 2009/0151162 A1 | 6/2009 | Xie et al. |

FOREIGN PATENT DOCUMENTS

| FR | 2 927 271 | 8/2009 |
| GB | 2 064 412 | 6/1981 |

OTHER PUBLICATIONS

International Search Report Issued Jan. 17, 2013 in PCT/FR12/051611 Filed Jul. 9, 2012.

*Primary Examiner* — Moshe Wilensky
(74) *Attorney, Agent, or Firm* — Oblon, McClelland, Maier & Neustadt, L.L.P.

(57) ABSTRACT

A method for manufacturing a turbine engine fan casing includes placing a fiber structure constituting the fiber reinforcement of a composite material inside skin of an acoustic coating on a tooling element, and then shaping the fiber preform constituting the fiber reinforcement of an abradable casing on the tooling element with cellular structures of acoustic coating and abradable coating cartridges, if any, being interposed. Both the fiber preform of the casing as impregnated by a precursor resin for the matrix of the composite material of the casing, and also the fiber structure of the inside skin of the acoustic coating as impregnated with a precursor resin for the matrix of the composite material of the inside skin are subjected to resin polymerizing heat treatment, and the inside skin of the acoustic coating is multiply perforated so an assembly is obtained that comprises the casing with an incorporated acoustic coating.

8 Claims, 3 Drawing Sheets

(51) Int. Cl.
  *B29C 70/48* (2006.01)
  *B29C 70/86* (2006.01)
  *F02C 7/045* (2006.01)
  *F01D 11/12* (2006.01)
  *B29C 70/46* (2006.01)
  *B29B 11/16* (2006.01)

(52) U.S. Cl.
  CPC .............. *F01D 11/122* (2013.01); *F02C 7/045* (2013.01); *B29B 11/16* (2013.01); *B29C 70/462* (2013.01); *F05D 2260/96* (2013.01); *F05D 2300/44* (2013.01); *F05D 2300/603* (2013.01); *F05D 2300/614* (2013.01); *F05D 2300/701* (2013.01); *F05D 2300/702* (2013.01); *Y02T 50/672* (2013.01); *Y10T 29/49327* (2015.01)

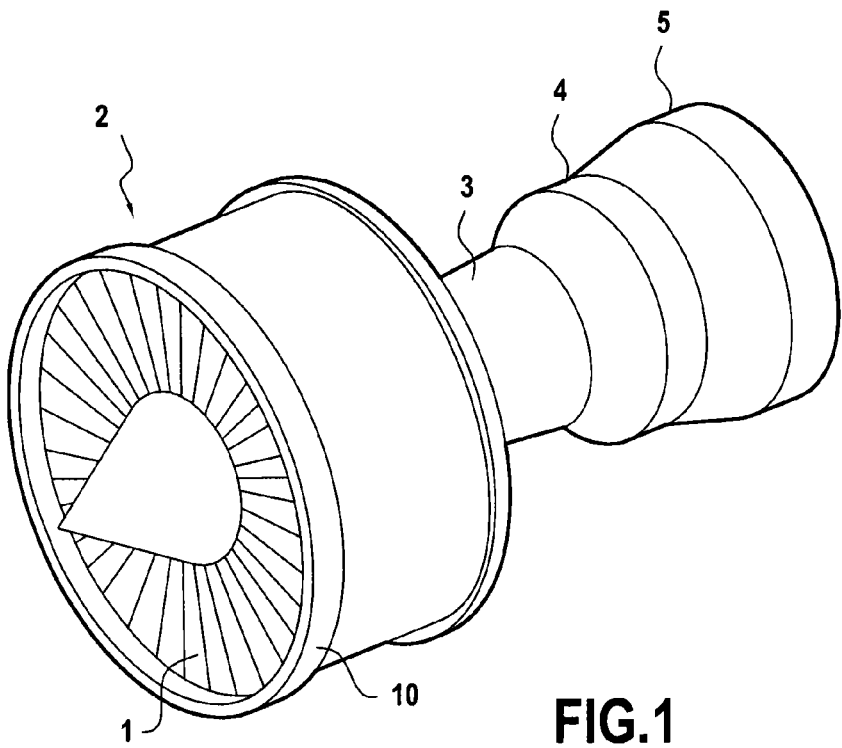
FIG.1
FIG.2
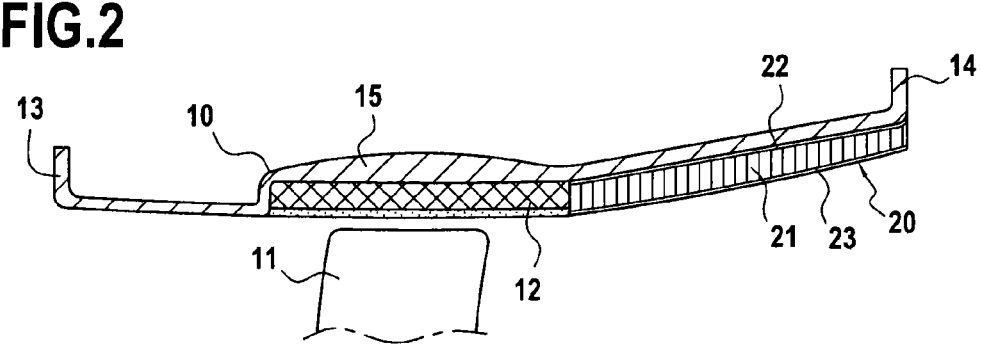
FIG.3
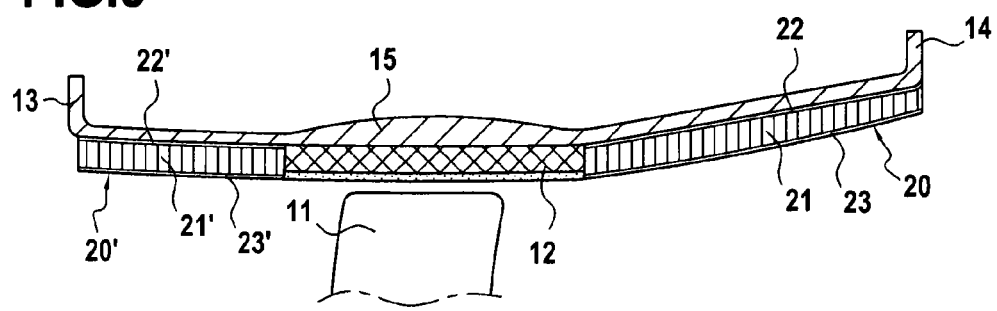

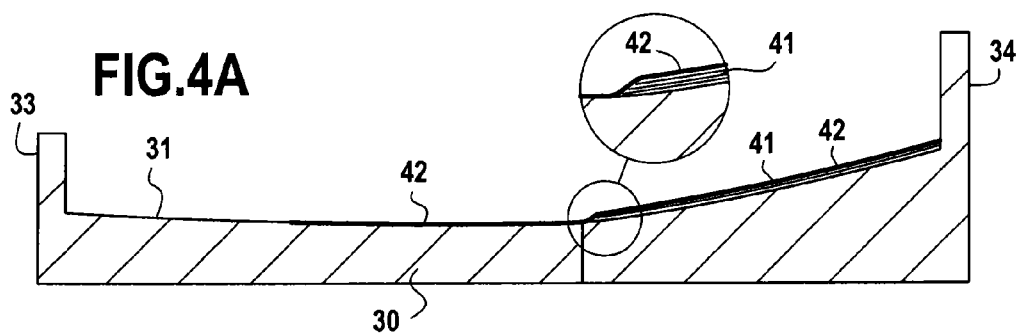
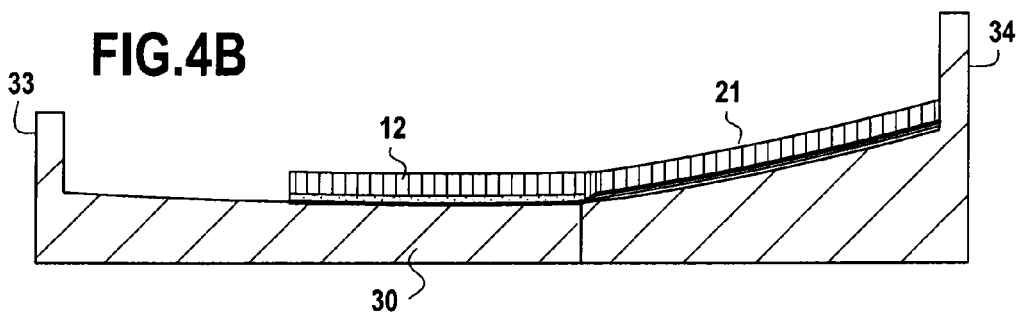
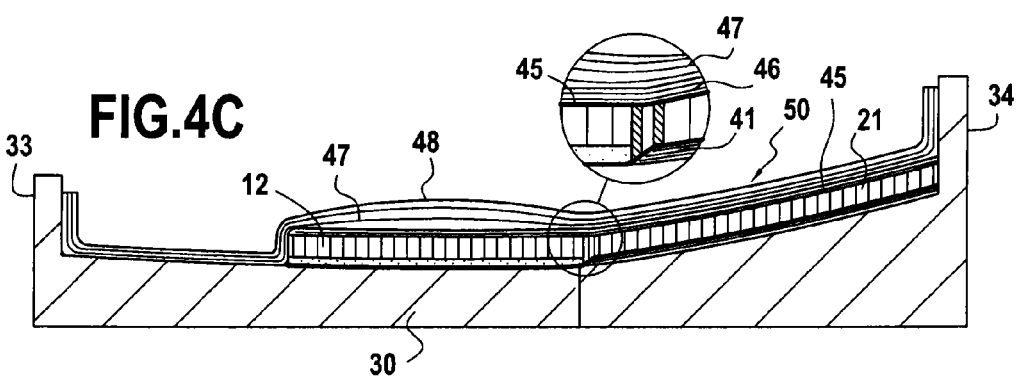
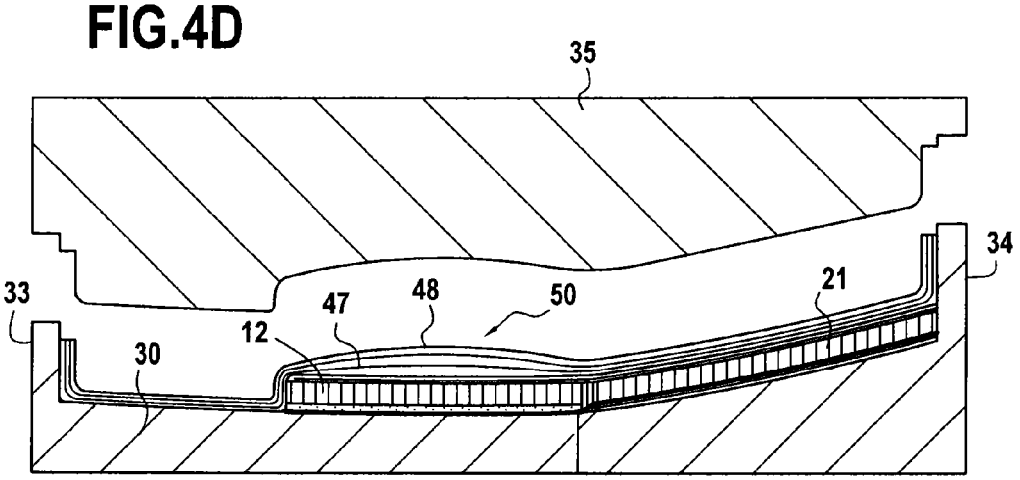

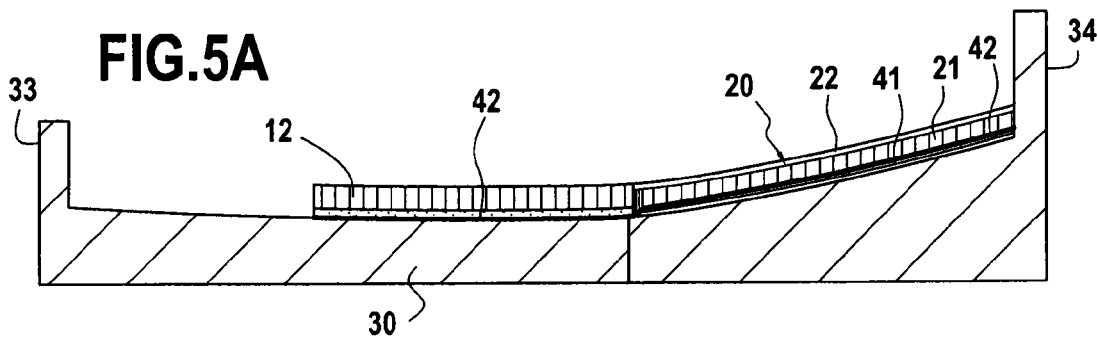
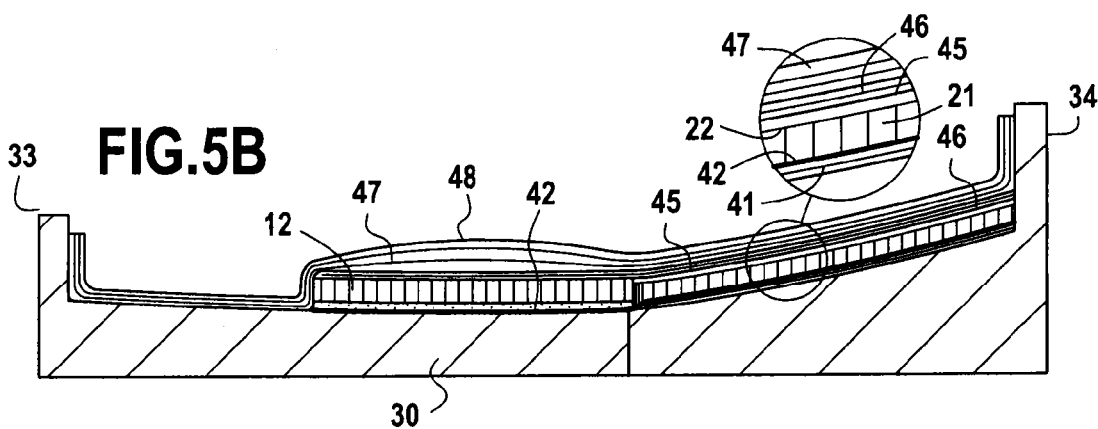
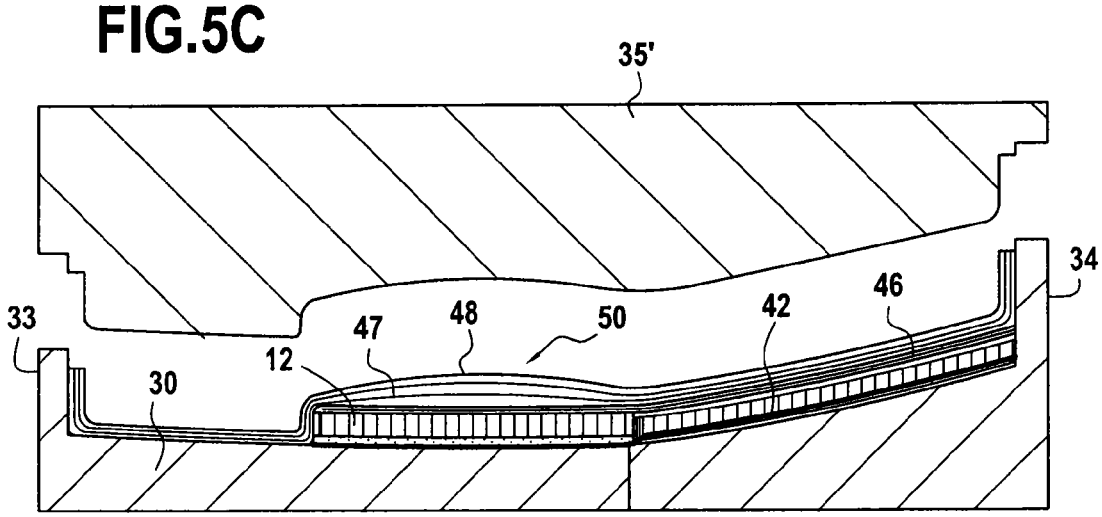

METHOD FOR MANUFACTURING A TURBINE-ENGINE FAN CASING HAVING AN ACOUSTIC COATING

BACKGROUND OF THE INVENTION

The invention relates to a method for manufacturing a turbine engine fan casing, in particular for an aeroengine.

In such a turbine engine, the fan casing performs several functions. It defines the air inlet passage of the engine, it supports an abradable coating in register with the blade tips of the fan, it incorporates or supports a retention shield forming a trap for debris, and it supports a soundwave absorber structure for acoustic treatment at the inlet of the engine.

It is well known to make a fan casing out of fiber-matrix composite material, generally with an organic matrix. Thus, document EP 1 961 923 describes making such a casing by densifying a fiber preform that is obtained by winding superposed layers of a three-dimensional woven texture that incorporates preform portions for the retention shield and for the flanges at the upstream and downstream ends of the casing.

It is also well known to provide acoustic treatment by fastening acoustic panels on the inside face of the casing, in the downstream portion and/or in the upstream portion thereof, i.e. on one side or both sides of the abradable coating. Usually, the panels are in the form of juxtaposed sectors, each extending over a portion of the inside periphery of the casing, and the panels are fastened to the casing by means of inserts incorporated in the panels and by means of screws.

Fastening acoustic panels in that way presents several drawbacks. It requires the use of a large number of small parts (inserts and screws). In addition, repeated drilling of the composite material casing can harm the mechanical properties of the composite material.

It is also possible to envisage fastening acoustic panels to a composite material casing by means of adhesive. Nevertheless, it is difficult to avoid residual deformation of the panels, thereby degrading the profile of the air inlet passage at the inside surfaces of the juxtaposed panels.

OBJECT AND SUMMARY OF THE INVENTION

An object of the invention is to avoid such drawbacks, and for this purpose, the invention provides a method of fabricating a turbine engine fan casing having an abradable coating on its inside face extending over a fraction of its axial dimension at a distance from upstream and downstream ends of the casing, and an acoustic coating arranged downstream and/or upstream of the abradable coating, the inside surfaces of the abradable coating and of the acoustic coating defining at least a portion of the wall of an air inlet passage, the casing being made of composite material comprising fiber reinforcement densified by a resin precursor matrix, the method comprising the steps of:

using a tooling element having a profile corresponding to the profile of the air inlet passage;
depositing a fiber structure that is to constitute fiber reinforcement of a composite material inside skin of the acoustic coating on the tooling element at a location corresponding to the location of the acoustic coating;
placing cellular structures of the acoustic coating in the form of sectors over said fiber structure;
shaping a fiber preform that is to constitute the fiber reinforcement of the casing on the tooling element with the cellular structures of the acoustic coating being interposed between them;
subjecting both the fiber preform of the casing as held in its shape and impregnated with a precursor resin for the matrix of the composite material of the casing and also the fiber structure of the inside skin of the acoustic coating as impregnated with a precursor resin for the matrix of the composite material of said inside skin to common polymerizing resin heat treatment; and
multiply perforating the inside skin of the acoustic coating after the precursor resin for the matrix of the composite material of said inside skin has polymerized;
whereby an assembly is obtained that comprises the casing assembled together with an incorporated acoustic coating comprising said cellular structures and said multiply perforated inside skin.

An acoustic coating is thus obtained that comprises a plurality of cellular structures forming sectors or panels with a multiply perforated inside skin that reproduces the profile of the tooling element and that thus accurately defines the air inlet passage in register with the acoustic coating. Profile irregularities due to deformations or variations of shape in prefabricated acoustic panels fitted on a prefabricated composite material casing are thus avoided. In addition, the same resin can be used both for the matrix of the composite material of the inside skin of the acoustic coating and for the matrix of the composite material of the casing.

Advantageously, the fiber preform that is to constitute the fiber reinforcement of the casing is shaped on the tooling element with elements constituting abradable coating cartridges being interposed, such that after polymerization an assembly is obtained comprising the casing with the abradable coating cartridges and the acoustic coating incorporated therein.

A layer of adhesive may be interposed between firstly the fiber preform of the casing and secondly the cellular structures of the acoustic coating and the abradable coating cartridges, if any.

An electrical isolation fiber layer may be interposed between firstly the fiber preform of the casing and secondly the cellular structures of the acoustic coating and also the abradable coating cartridges, if any. This layer also has a function of protecting the structure of the casing in the event of the acoustic coating or the abradable coating being adjusted or repaired.

An adhesive coating may be interposed between the fiber structure that is to constitute the fiber reinforcement of the inside skin of the acoustic coating and the cellular structures of the acoustic coating.

In an implementation of the method, the fiber preform forming the fiber reinforcement of the casing and the fiber structure forming the fiber reinforcement of the inside skin of the acoustic coating are both formed of fiber textures that are preimpregnated with resin.

In another implementation, the fiber preform that is to form the fiber reinforcement of the casing and the fiber structure that is to form the fiber reinforcement of the inside skin of the acoustic coating are both impregnated with resin after the fiber preform has been shaped.

BRIEF DESCRIPTION OF THE DRAWINGS

Particular embodiments of the invention are described below by way of non-limiting indication, with reference to the accompanying drawings, in which:

FIG. 1 is a highly diagrammatic view of an aeroengine gas turbine;

FIGS. 2 and 3 are highly diagrammatic half-views in axial section of fan casings that can be made in accordance with the invention for an engine of the kind shown in FIG. 1;

FIGS. 4A to 4D show two successive steps in fabricating a fan casing of the kind shown in FIG. 2, in a first implementation of the invention; and FIGS. 5A to 5C show the successive steps of fabricating a fan casing of the kind shown in FIG. 2, in a second implementation of the invention.

DETAILED DESCRIPTION OF IMPLEMENTATIONS

The invention is described below in the context of its application to a fan casing for an aeroengine gas turbine.

As shown diagrammatically in FIG. 1, such an engine comprises from upstream to downstream in the flow direction of the gas stream: a fan 1 arranged at the inlet of the engine; a compressor 2; a combustion chamber 3; a high pressure (HP) turbine 4; and a low pressure (LP) turbine 5. The turbines 4 and 5 are coupled respectively to the compressor 2 and to the fan 1 by respective coaxial shafts. The engine is housed in a casing made up of a plurality of portions corresponding to different elements of the engine. Thus, the fan 1 is surrounded by a fan casing 10.

As shown in FIG. 2, the casing 10 has flanges 13, 14 at its ends, while in its portion situated in register with the blade tips 11 of the fan it has extra thickness forming a retention shield 15. The flanges 13, 14 enable the fan casing to be attached. The retention shield 15 constitutes a trap for debris projected by centrifuging, for the purpose of preventing such debris from passing through the casing and reaching other portions of the airplane.

In its portion situated in register with the blade tips 11, the casing 10 also has an abradable coating on its inside face. The coating may be made up of a set of juxtaposed cartridges or panels 12 that are fastened to the casing 10 and lined with abradable material, e.g. as described in document EP 2 088 290.

On its inside face, the casing 10 has at least one soundproofing coating or acoustic coating. In the embodiment of FIG. 2, the acoustic coating 20 is arranged in the downstream portion of the casing 10 between the abradable coating and the downstream end of the casing, while in its upstream portion, between its upstream end and the abradable coating, the casing 10 is shaped to co-operate with the inside surfaces of the abradable coating cartridges 12 and of the acoustic coating 20 to define an air inlet passage having a wall that is substantially continuous. In the embodiment of FIG. 3, two acoustic coatings 20 and 20' are provided, one of the coatings 20 being arranged in the downstream portion of the casing 10, as in FIG. 2, and the other coating 20' being arranged in the upstream portion of the casing 10 between its upstream end and the abradable coating 12, the inside surfaces of the coating 20', of the abradable coating cartridges 12, and of the coating 20 defining the air inlet passage.

Each acoustic coating 20, 20' extends over the entire inside periphery of the casing 10 and comprises a set of cellular structures 21, 21' in the form of juxtaposed panels or sectors. The cellular structures 21, 21' are arranged between an outer skin 22, 22' pressed against the inside face of the casing 10 and an inside skin 23, 23' with multiple perforations, the honeycomb being made up of cells that are defined by walls extending substantially radially between the skins.

An embodiment of a casing of the kind shown in FIG. 2 and that is provided with an abradable coating and with an acoustic coating is described below with reference to FIGS. 4A to 4D.

An axisymmetric former 30 is used having an outside surface 31 with a profile that reproduces the profile of the air inlet passage along the casing 10 of the engine and that presents rims 33, 34 at its ends. The former 30 is made up of a plurality of portions that are assembled together so as to enable it to be disassembled.

A fiber structure 41 made up of one or more resin preimpregnated fiber layers, e.g. of woven fabric, and that is to constitute the fiber reinforcement of the composite material inside skin 23 of the acoustic coating is placed on the former 30 at a location corresponding to the location of the acoustic coating (FIG. 4A).

A layer or film of adhesive 42, e.g. of epoxy, polyurethane, or polyimide resin, is preferably deposited on the fiber structure 41 and on the former 30 at the location for the abradable coating cartridges.

The cellular structures 21 of the acoustic coating are deposited on the adhesive film 42 over the fiber structure 41 (FIG. 4B). Each cellular structure 21 forms a panel that extends over a sector around the axis of the former 30, the cellular structures 21 being juxtaposed so as to cover the entire periphery of the former 30 over the layers of fabric 41. By way of example, it is possible to use four, five, or six cellular structures such as honeycomb structures in which the cells are defined by radially-extending walls.

Abradable coating cartridges 12 are placed on the adhesive film 42 in a location corresponding to that of the abradable coating. Each cartridge extends over a sector around the axis of the former 30, the cartridges 12 being juxtaposed. By way of example, it is possible to use four, five, or six cartridges. In known manner, each cartridge 12 may include, on its exposed inside surface, a honeycomb structure, e.g. made of a "Nomex" honeycomb filled with an abradable material and adhesively bonded to an aluminum or "Nomex" honeycomb, possibly with an interposed glass fiber fabric. In a variant, the "Nomex" honeycomb may be replaced by a fiber layer onto which the abradable material is deposited. Reference can be made to document EP 1 510 657, for example.

The adhesive layer 42 makes it easier to hold the cellular structure 21 and the cartridges 12 in place.

Prior to putting the fiber preform forming the fiber reinforcement of the casing 10 into place, an adhesive layer or film 45 is optionally deposited on the cellular structures 21 and on the cartridges 12 and it may be covered in at least one layer of fabric 46 (FIG. 4C). Where necessary, the layer of fabric 46 makes it possible to provide electrical isolation between the casing on one side and the abradable coating cartridges and the acoustic coating on the other side. This contributes also to protecting the structure of the casing in the event of an abradable coating cartridge or a portion of the acoustic coating being adjusted or repaired. The layer of fabric may be made of glass fibers or other insulating materials. Over the acoustic coating, the layer of fabric 46 may also contribute to forming the outside skin thereof. In a variant, this outside skin could be incorporated in the cellular structures 21.

The fiber preform 50 of the casing 10 may be obtained by winding several superposed layers or turns of a fiber texture 47, e.g. made by three-dimensional or multilayer weaving, as described in document EP 1 961 923, which texture is preimpregnated with a resin. A fiber texture is used that presents varying thickness, e.g. by varying the number of layers of warp yarns and weft yarns in the fabric in order to obtain a thicker portion 48 in the location of the retention shield. In a variant, the fiber preform 50 may be obtained by draping plies of two-dimensional fabric or by braiding.

The fibers of the fiber structure 41 and of the fiber texture 47 may be carbon, glass, aramid, or ceramic fibers, for example. Each impregnation resin of the fiber structure 41, of the fiber texture 47, and possibly of the layer of fabric 46 may for example be a resin that is a precursor for a polymer matrix such as an epoxy, bismaleimide, or polyimide polymer. It is possible to use different resins for impregnating the fiber structure 41, the fiber texture 47, and the layer of fabric 46. Nevertheless, it is preferable to use the same resin.

Tooling elements 35 made up of a plurality of sectors are applied to the outside surface of the preform 50 (FIG. 4D) in order to hold it in the desired shape, and heat treatment is performed to polymerize the impregnation resin(s).

By way of example, the adhesive layer 45 is made of epoxy resin and, where appropriate, it may be cured during the polymerization heat treatment of the impregnation resin(s). It is preferably present to ensure effective bonding between the casing on one side and the abradable coating cartridges and the cellular structures of the acoustic coating on the other.

After polymerization, the resulting casing with the abradable coating cartridges and the acoustic coating is extracted from the tooling constituted by the former 30 and the elements 35. Final machining is performed comprising in particular multiply perforating the inside skin 23 of the acoustic coating and forming holes in the fastener flanges of the coating.

FIGS. 5A to 5C show another implementation of the method of the invention, with elements that are common with the implementation shown in FIGS. 4A to 4D having the same references.

A former 30 is used that is similar to that of the implementation of FIGS. 4A to 4D.

One or more layers of fabric forming a fiber structure 41 that is to constitute the fiber reinforcement of the composite material inside skin of the acoustic coating is/are deposited on the former 30 as in FIG. 4A, but without being preimpregnated with resin.

After an adhesive layer or film 42 has been deposited, cellular structures, each having an outside skin 22, are put into place on the former 30, as are abradable coating cartridges such as the cartridges 12 described above (FIG. 5A).

At least one layer 46 of non-impregnated fabric for providing electrical isolation and protection may be arranged on the outside skin 22 of the cellular structures of the panels 20 and on the cartridges 12, with a layer or film of adhesive 45 being interposed as described above, and then the fiber preform 50 of the casing is made as described above, but using a fiber texture 47 that is not preimpregnated with resin (FIG. 5B).

Tooling elements 35' made up of a plurality of sectors are applied against the outside surface of the preform 50 (FIG. 5C), these tooling elements being provided with channels (not shown) for injecting or infusing resin into the preform 50, the fiber structure 41, and the layer of fabric 46, if any.

The resin is then polymerized and the resulting casing provided with its abradable coating cartridges and with the acoustic coating is subjected to final machining, which comprises multiply perforating the inside skin of the acoustic coating.

The cellular structures put into place on the adhesive film 42 may optionally not be provided with an outside skin, like the elements 21 in FIG. 4C.

In order to avoid the injected or infused resin penetrating into the cells of the cellular structures of the acoustic coating, these cells may be filled with a material that can subsequently be eliminated or removed, e.g. "Teflon". This material is eliminated or removed after the inside skin of the acoustic coating has been formed and possibly perforated. Naturally, the method may easily be adapted to making a fan casing that is provided with acoustic coating both in its upstream portion and in its downstream portion, as shown in FIG. 3.

Above, it is assumed that the fan casing is fabricated so as to form a unit including abradable coating cartridges and at least one acoustic coating.

The fabrication method could be performed for fabricating a fan casing forming an assembly incorporating only at least one acoustic coating in the event of the abradable coating, not being in the form of cartridges but being a layer of abradable material that is deposited directly on the inside face of the casing. Under such circumstances, in order to make the casing preform, it is advantageous to use a former of shape that is appropriate for reserving the location for depositing the abradable material after the casing has been fabricated.

The invention claimed is:

1. A method for manufacturing a turbine engine fan casing having an abradable coating on its inside face extending over a fraction of its axial dimension at a distance from upstream and downstream ends of the casing, and an acoustic coating arranged downstream and/or upstream of the abradable coating, the inside surfaces of the abradable coating and of the acoustic coating defining at least a portion of the wall of an air inlet passage, the casing being made of composite material comprising fiber reinforcement densified by a resin precursor matrix, the method comprising:

using a tooling element having a profile corresponding to the profile of the air inlet passage;

depositing a fiber structure that is to constitute fiber reinforcement of a composite material inside skin of the acoustic coating on the tooling element at a location corresponding to the location of the acoustic coating;

placing cellular structures of the acoustic coating in the form of sectors over said fiber structure;

shaping a fiber preform that is to constitute the fiber reinforcement of the casing on the tooling element with cellular structures of the acoustic coating being interposed between them;

subjecting both the fiber preform of the casing as held in its shape and impregnated with a precursor resin for the matrix of the composite material of the casing and also the fiber structure of the inside skin of the acoustic coating as impregnated with a precursor resin for the matrix of the composite material of said inside skin to common resin polymerizing heat treatment; and multiply perforating the inside skin of the acoustic coating after the precursor resin for the matrix of the composite material of said inside skin has polymerized;

whereby an assembly is obtained that comprises the casing assembled together with an incorporated acoustic coating comprising said cellular structures and said multiply perforated inside skin.

2. The method according to claim 1, wherein the fiber preform that is to constitute the fiber reinforcement of the casing is shaped on the tooling element with elements constituting abradable coating cartridges being interposed, such that after polymerization an assembly is obtained comprising the casing with the abradable coating cartridges and the acoustic coating incorporated therein.

3. The method according to claim 2, wherein a layer of adhesive is interposed between firstly the fiber preform of the casing and secondly the cellular structures of the acoustic coating and also the abradable coating cartridges.

4. The method according to claim 2, wherein an electrical isolation fiber layer is interposed between firstly the fiber preform of the casing and secondly the cellular structures of the acoustic coating and also the abradable coating cartridges.

5. The method according to claim 1, wherein an adhesive coating is interposed between the fiber structure that is to constitute the fiber reinforcement of the inside skin of the acoustic coating and the cellular structures of the acoustic coating.

6. The method according to claim 1, wherein the fiber preform forming the fiber reinforcement of the casing and the fiber structure forming the fiber reinforcement of the inside skin of the acoustic coating are both formed of fiber textures that are preimpregnated with resin.

7. The method according to claim 1, wherein the fiber preform that is to form the fiber reinforcement of the casing is impregnated with resin after the fiber preform has been shaped.

8. The method according to claim 1, wherein the fiber preform that is to form the fiber reinforcement of the casing and the fiber structure that is to form the fiber reinforcement of the inside skin of the acoustic coating are both impregnated with resin after the fiber preform has been shaped.

\* \* \* \* \*